(12) United States Patent
Barak et al.

(10) Patent No.: US 7,756,519 B2
(45) Date of Patent: Jul. 13, 2010

(54) INTERFERENCE MITIGATION TECHNIQUE

(75) Inventors: Oz Barak, Hod Hasharon (IL); Assaf Touboul, Natanya (IL)

(73) Assignee: Designart Networks Ltd, Ra'Anana (IL)

( * ) Notice: Subject to any disclaimer, the term of this patent is extended or adjusted under 35 U.S.C. 154(b) by 549 days.

(21) Appl. No.: 11/744,871

(22) Filed: May 6, 2007

(65) Prior Publication Data
US 2008/0274745 A1   Nov. 6, 2008

(51) Int. Cl.
*H04W 40/00* (2009.01)
(52) U.S. Cl. .................. 455/447; 455/422.1; 455/63.1; 455/114.2; 455/296
(58) Field of Classification Search .................. 455/447, 455/422.1, 63.1, 114.1, 296
See application file for complete search history.

(56) References Cited

U.S. PATENT DOCUMENTS

| 7,136,655 | B2 | 11/2006 | Skafidas |
| 7,639,727 | B1 * | 12/2009 | Brisebois et al. ............ 375/134 |
| 2001/0012780 | A1 | 8/2001 | Edwards |
| 2001/0046866 | A1 | 11/2001 | Wang |
| 2004/0259556 | A1 | 12/2004 | Czys |
| 2006/0099954 | A1 | 5/2006 | Henderson |
| 2007/0010261 | A1 | 1/2007 | Dravida |

\* cited by examiner

*Primary Examiner*—Nghi H Ly
(74) *Attorney, Agent, or Firm*—Deborah A. Gador

(57) ABSTRACT

A backhaul network for a mobile wireless network including a plurality of nodes forming links, the links utilizing a 1:n frequency re-use scheme in backhaul communication, where n equals 2 to about 16, wherein each link communicates over a different portion of an entire bandwidth of the network.

7 Claims, 4 Drawing Sheets

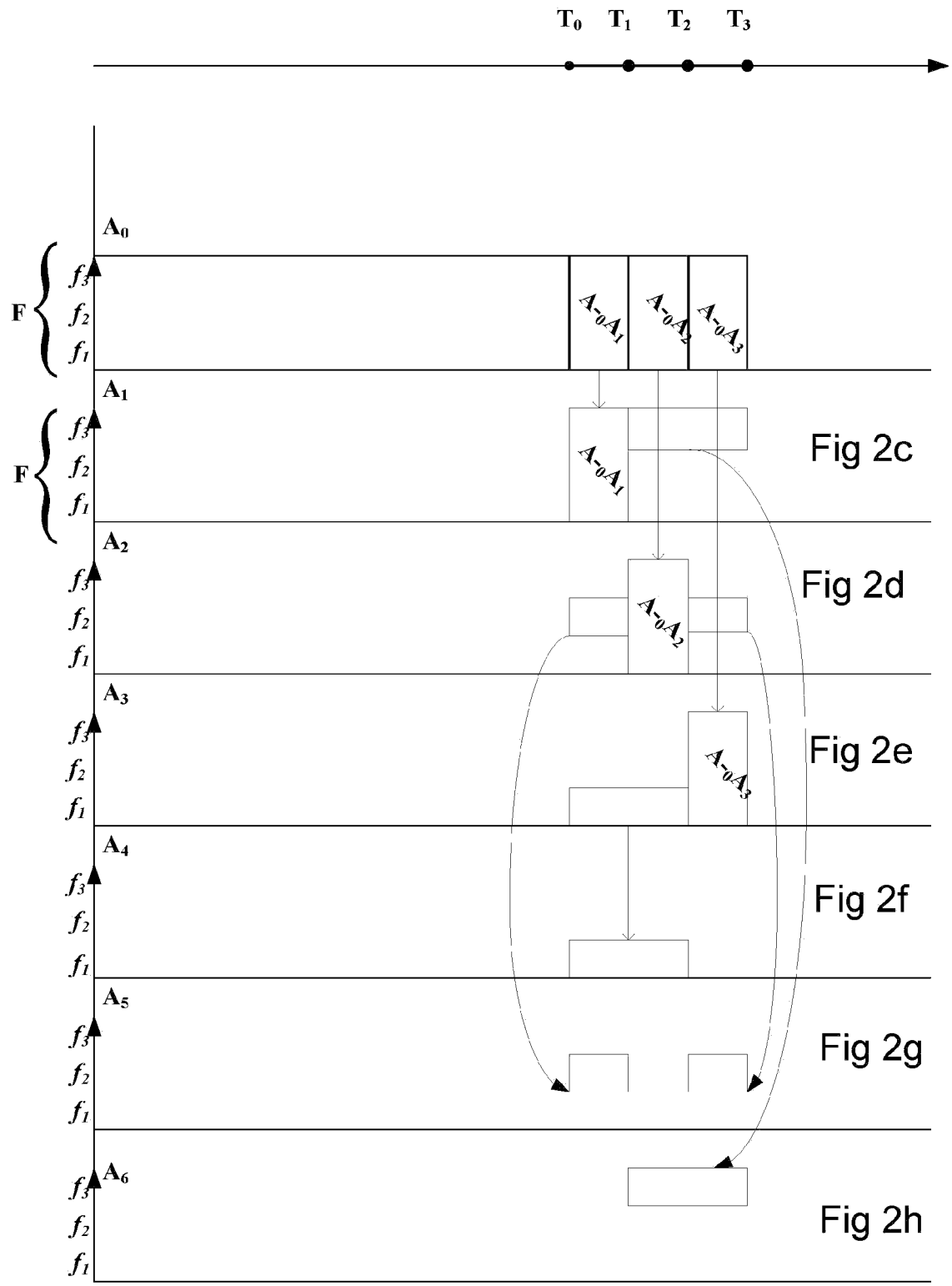

INTERFERENCE MITIGATION TECHNIQUE

FIELD OF THE INVENTION

The present invention relates to communications networks, in general and, in particular, to an interference mitigation technique for mobile wireless communication networks.

BACKGROUND OF THE INVENTION

Broadband wireless is expected to be one of the main drivers of the telecommunications industry. There is a substantial increase in demand for broadband connectivity, with personal broadband being the key growth engine for mobile wireless broadband networks.

Communication in such networks is generally divided between access and backhaul. An access network is the air interface network providing traffic communication between mobile terminals (subscribers) and their associated access points (base stations), while a backhaul network is the air interface network providing traffic communication between the various base stations and a core network. The networks may be arranged to transfer data alone, as in Wi-Fi networks, or may be arranged for triple play services (video, audio and data), typically WiMax (or other competitive technology, such as 3GPP-LTE). In conventional systems, the access network and the backhaul network each require their own separate transmission equipment, antennas, etc, at great cost to the operator.

One example of a conventional backhaul network is connecting wireless base stations to corresponding core mobile networks (ASN GateWay, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy (equipment and installation). In particular, due to the direct, uninterrupted line-of-sight requirements of the wireless backhaul equipment, the backhaul components of conventional base stations require strategic deployment location on high and expensive towers.

Mobile WiMAX, as defined in IEEE Standard 802.16e-2005 Standardization for WiMAX, was originally designed to provide mobile broadband access for mobile devices, i.e., broadband wireless data-optimized technology, providing carrier-grade triple play services using a variety of user devices (such as laptops, PDAs, handheld devices, smart phones, etc.). A complete mobile WiMAX Radio Access Network (RAN) requires deployment of massive infrastructure, including base station sites with high towers, base station equipment, antennas, and a separate backhaul network, as described above.

In conventional cellular networks, it is known to use one of several radio frequency re-use schemes in radio access communication. The frequency re-use scheme defines the division of the total available bandwidth (frequency channel) between sectors of a cell or between entire cells. Typically, the frequency re-use scheme is selected depending on the network deployment topology.

A frequency reuse scheme of 1:1 (as in Full Usage of SubCarriers (FUSC) or Partial Usage of SubCarriers (PUSC) using all sub-channels, in WiMax) implies that all cells use the same sub-carriers (frequency band or sub-band) F at different times across their borders. An alternative re-use scheme 3:3 can be used, where each cell in each group of 3 cells transmits, at the same time, over a different frequency band or sub-band $f_1$, $f_2$, $f_3$ (out of 3 possible bands). A frequency re-use scheme of 1:3 (e.g., as in PUSC in WiMax), indicates that each cell is divided into three sectors, and each sector operates, at the same time, in a different frequency band or sub-band (⅓ of the spectrum) $f_1$, $f_2$, $f_3$. In this case, coordination between cells is required to minimize interference between adjacent cells. It will be appreciated that, in backhaul, all transmissions are over the entire bandwidth F.

There are also known outdoor Wi-Fi networks, deployed mainly according to outdoor Wi-Fi mesh technology. The typical Wi-Fi setup contains one or more Access Points (APs) (which is the equivalent terminology to Base Station in WiMax), having relatively limited range, deployed along telephone poles, street poles, electricity poles and rooftops. Due to the access point unit's smaller coverage range, a large number of access point units are required to cover a given area, typically between 20 to 30 access points per square mile, with wired backhaul at each 3 or 4 hops (known as micro- or pico-cell deployment).

Furthermore, in the micro/pico-cell deployment approach of conventional Wi-Fi mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive, due to costly equipment and installation costs. Furthermore, it is not feasible to deploy conventional Wi-Fi backhaul units on telephone poles, street poles, electricity poles, etc., due to the physical dimensions of the backhaul unit and lack of line of sight in urban below-rooftop deployment. In addition, when the network traffic load is increased in such deployment, traffic capacity losses in the backhaul network drastically degrade the overall network performance (capacity and latency), due to incremental loading of cascaded access points in a certain route to the physical line backhaul.

There remains a long felt need for a wireless mobile broadband network that provides in-band backhaul having an interference mitigation technique that reduces interference between adjacent clusters, and particularly between clusters whose transmissions are not coordinated with one another by a central controller.

SUMMARY OF THE INVENTION

The present invention relates to backhaul communication in a wireless mobile network, such as WiMAX, having multi-hop deployment, wherein the network is built from a plurality of nodes or access points providing service to a certain geographical area (a cell) and wirelessly interconnected to one another in virtual clusters. In each cluster, one access point, known as a feeder node, serves as the backhaul connection point of the whole cluster to a core network In particular, the invention provides a backhaul network for a mobile wireless network including a plurality of nodes forming links, the links utilizing a 1:n frequency re-use scheme in backhaul communication, where n equals 2 to about 16, wherein each link communicates over a different portion of an entire bandwidth of the network.

There is provided according to the present invention a method of reducing interference, during backhaul communication, between edge nodes from adjacent clusters in a mobile broadband wireless deployment including a plurality of clusters having uncoordinated radio resources, each cluster including a feeder coupled to a core network and a plurality of nodes or access points coupled in multi-hop topology to the feeder. The method includes dividing the cluster into tiers, according to number of hops to the feeder, utilizing a 1:1 frequency re-use scheme within the innermost tier or tiers (i.e., all transmit on the same frequencies (bandwidth) on the whole channel bandwidth but at different times), and utilizing a 1:n (where n can be between 2 and about 16) frequency re-use scheme in the outermost tier (i.e., each edge link transmits over a different section of the total bandwidth at the same time) in backhaul.

It will be appreciated that this deployment can be either outdoors, as on light poles and below rooftop on buildings, or indoors, to provide networking capability inside large buildings and malls.

There is further provided, according to the present invention, an interference mitigation system for a network including a plurality of nodes coupled for wireless communication in virtual clusters of nodes, each cluster including a feeder coupled to a core network, a wireless link being formed between each pair of adjacent nodes, each node including at least one, and preferably a plurality of transceivers providing access communication and backhaul communication over the link; a modem coupled to each transceiver; and a plurality of antennas mounted in the node, one coupled to each modem, the antennas being able to provide multiple concurrent transmissions over multiple antennas; a controller in each node adapted and configured for control and coordination of the transceivers and associated modems, the interference mitigation system including elements for creating sectorization of each node; and software algorithm for dividing the cell into tiers, according to number of hops to the feeder, means for causing transmission and reception utilizing a 1:1 frequency re-use scheme within the innermost tier or tiers wherein all transmit over an entire available bandwidth at a same time; and means for causing transmission and reception utilizing a 1:3 or 1:n frequency re-use scheme in an outermost tier, wherein nodes in said outermost tier transmit at a same time over a different portion (2 to n slices of the available spectrum) of said entire available bandwidth.

BRIEF DESCRIPTION OF THE DRAWINGS

The present invention will be further understood and appreciated from the following detailed description taken in conjunction with the drawings in which:

FIG. 2b is a schematic illustration of a transmission frame in the spatial interference mitigation scheme of FIG. 2a;

FIG. 2c is a schematic illustration of a transmission frame in the spatial interference mitigation scheme of FIG. 2a;

FIG. 2d is a schematic illustration of a transmission frame in the spatial interference mitigation scheme of FIG. 2a;

FIG. 2e is a schematic illustration of a transmission frame in the spatial interference mitigation scheme of FIG. 2a;

FIG. 2f is a schematic illustration of a transmission frame in the spatial interference mitigation scheme of FIG. 2a;

FIG. 2g is a schematic illustration of a transmission frame in the spatial interference mitigation scheme of FIG. 2a;

FIG. 2h is a schematic illustration of a transmission frame in the spatial interference mitigation scheme of FIG. 2a;

DETAILED DESCRIPTION OF THE INVENTION

A point to point communication system providing high capacity backhaul between links, particularly suited for use in mobile wireless communication networks, such as WiMAX, Wi-Fi, etc., is described in detail in applicant's co-pending U.S. application Ser. No. 11/624,232, filed on Jan. 18, 2007, entitled: Point-To-Point Communication Method. This system provides high capacity, high spectral efficiency backhaul transmissions between two nodes over a link in a micro- or pico-cell deployment. Preferably, each node includes a plurality of omni-directional antennas permitting up to 3 MIMO streams adaptively allocated to different antennas; and controlled beam pattern bandwidth for improving transmission quality and for interference mitigation. A number of other interference mitigation techniques for reducing interference over a link during backhaul are disclosed in the applicant's co-pending U.S. application Ser. No. 11/623,774, filed on Jan. 17, 2007, entitled: Point-To-Point Communication Method with Interference Mitigation. However, interference also arises between adjacent clusters of links, which can lead to a reduction in transmission quality.

The present invention relates to a method of reducing interference between edge nodes from adjacent clusters during backhaul communication in a mobile wireless deployment including a plurality of clusters, each cluster including a feeder coupled to a core network and a plurality of nodes coupled in multi-hop topology to the feeder. Each node can be an access point, a base station, a relay station, or any other infrastructure element which supports wireless infrastructure to infrastructure communication, and preferably includes a single controller (e.g., MAC controller) for controlling and coordinating both access and backhaul communications in the node. A conventional backhaul network, preferably a wired network, may be utilized to provide backhaul between the core network and the feeder node in each cluster. In one embodiment of the invention, the feeder can be a macro base station.

It will be appreciated that reduction of interference between clusters during backhaul eliminates the need for centralized coordination between the feeders of the various clusters. However, the clusters should be synchronized in terms of beginning of transmission and should be designed with the same backhaul allocation start time (to all the edges nodes) and also the same allocation of transmission/reception time.

In particular, this communication system is suitable for use in mobile wireless networks deployed like WiMax or WiFi networks, particularly those having micro- or pico-cell deployment, where the deployment is divided into virtual clusters. Preferably, a star or multi-hop deployment architecture is utilized.

Figure 1:
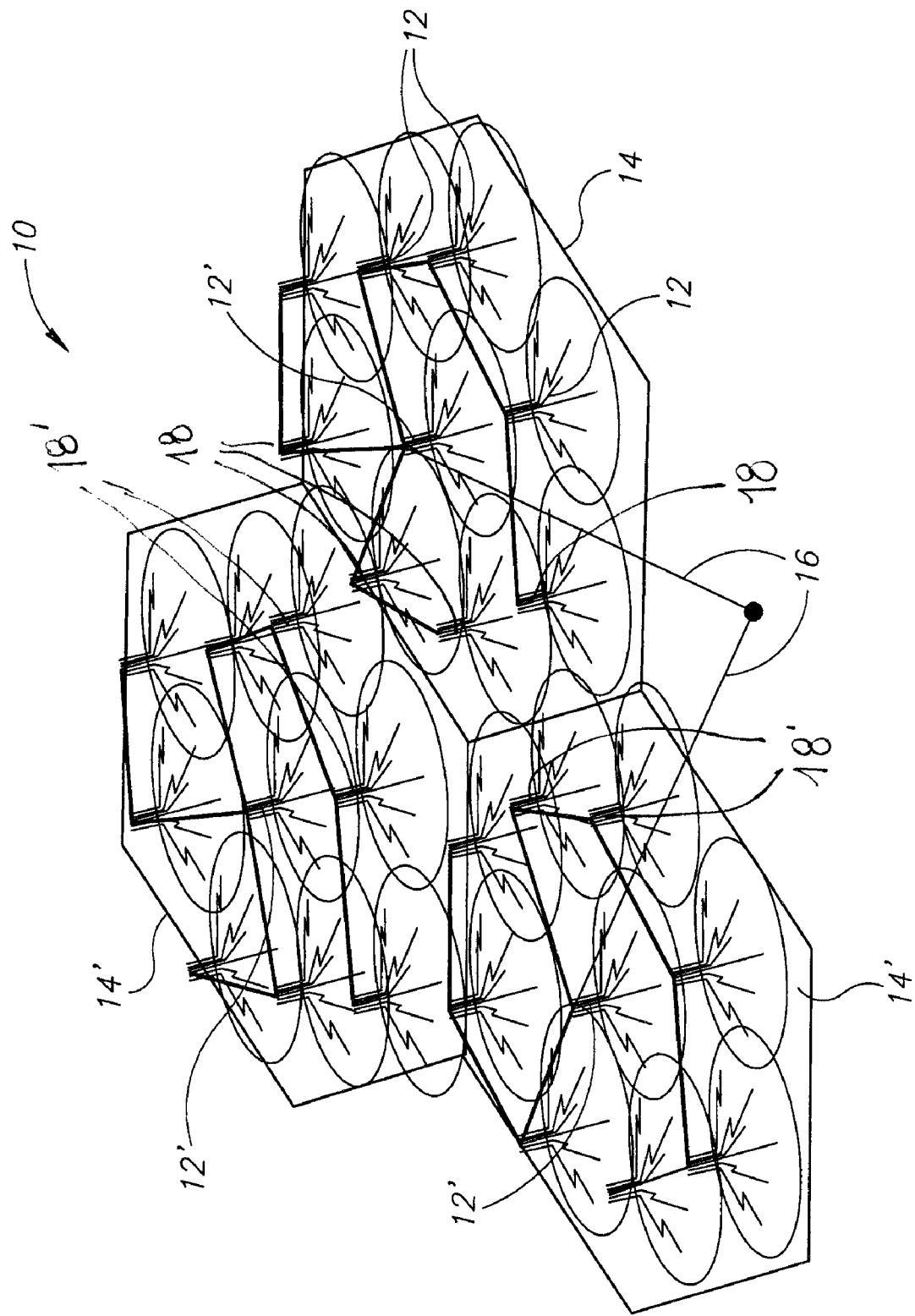
FIG. 1 is a schematic illustration of a wireless network constructed and operative in accordance with one embodiment of the present invention.

One example of a mobile wireless network according to the invention is illustrated schematically in FIG. 1. The network 10 includes a plurality of nodes or access point units 12, each of which acts as a base station for its cell. Deployment coverage is provided by a network of nodes, which is logically divided to multiple clusters 14, 14' (defined as a logically connected group of nodes). Each cluster 14 is formed of a group of nodes 12 wirelessly interconnected to each other (as shown in heavy black lines), each of which provides wireless access to part of the cluster. In each cluster, one access point coordinates all the access points within the cluster and manages the backhaul network interference-mitigation scheme within the cluster. This access point is referred to as a feeder node. For purposes of the present application, the terms node and access point unit refer also to base stations and to relay stations, and the term feeder also relates to macro base stations. The feeder nodes 12' in each cluster are preferably physically connected to the wired backhaul 16, and serve as the backhaul connection point of the whole cluster 14 to the core network (not shown). Each node 12 provides access to wireless subscribers in its cell coverage area and communicates with at least one other node in the cluster, via the point-to-point communication of the invention, as described below. This communication can either be directly with the feeder node or via another node acting as a relay, to transfer its aggregated traffic towards the core network. As can be seen, certain nodes 18, located at the edges of cluster 14, are spatially close to edge nodes 18' in an adjacent cluster 14', and are likely to create interference during concurrent transmissions over the same frequency bandwidth.

When there is more than one link near one another utilizing this PTP communication, interference is likely to arise during concurrent transmission using the same time and frequency resources over spatially close links. By observing link conditions throughout the cluster, the feeder node self-learns the interference within the cluster on each backhaul link, and adaptively optimizes the cluster backhauling links to the network by tuning beam width, power, sub-carrier allocation and modulation for each backhaul point to point transmission. In addition, one or more interference mitigation techniques can be employed to reduce the effects of this interference. A number of techniques are available for such interference mitigation for the backhaul PTP link, which are designed to maintain a CINR as high as possible in each link, so that the spectral efficiency of each backhaul link will remain high. These include, among others, transmit power control, spatial beam coordination, sub-channel management (OFDMA), as well as null steering, coding (CDMA), link coordination, all described in detail in Applicant's application entitled Point-To-Point Communication Method with Interference Mitigation, cited above.

The methods listed above serve principally to reduce the interference within each cluster. However, it will be appreciated that interference between clusters can also pose a performance limitation. A novel method of interference mitigation according to the present invention that reduces interference between edge nodes in adjacent clusters is called fractional frequency division or re-use. It is important to note that this method can be utilized both in multiple access periods and in backhaul. In multiple access periods, it is used to increase the capacity within each cell, while in backhaul periods; it is utilized to reduce interference between clusters, substantially eliminating the need to coordinate adjacent feeders.

The present invention provides a method of reducing interference in a mobile wireless network including a plurality of clusters of nodes, each cluster including a feeder node coupled to a core network and at least one node coupled in multi-hop topology to the feeder node. The method includes utilizing a 1:n frequency re-use scheme in backhaul communication, where n equals 2 to about 16, for at least two spatially adjacent nodes in the network having uncoordinated radio resources, wherein each of the nodes transmits over a different portion of an entire bandwidth of the network. For purposes of the invention, "radio resources" includes frequency, time and spatial allocation.

Figure 2A:
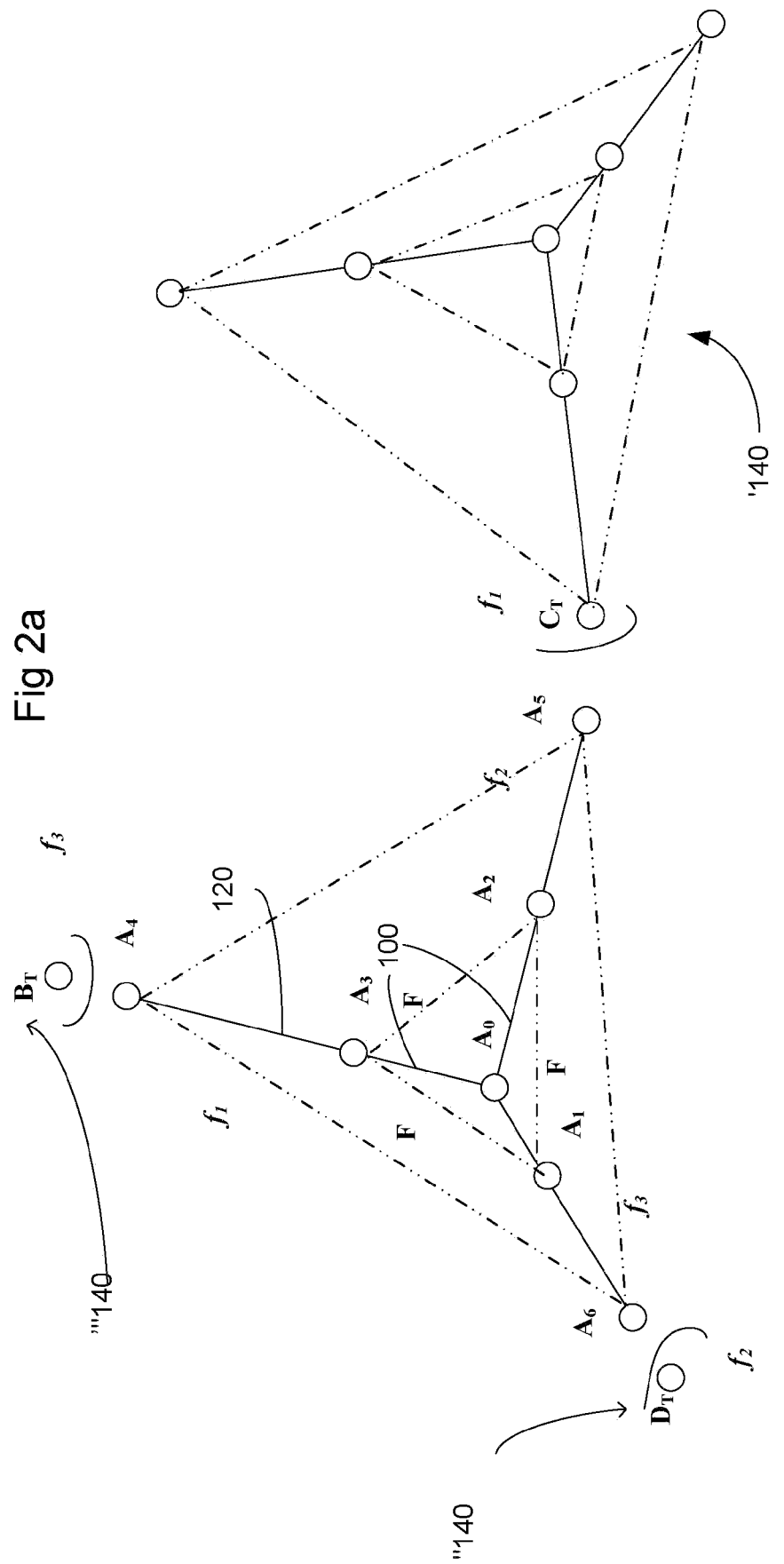
FIG. 2a is a schematic illustration of a spatial interference mitigation scheme for a node, according to one embodiment of the invention.

Each cluster can be viewed as including several branches, each branch being a line of nodes coupled to one another from a feeder via relays. During the time that backhaul communications occur over a link (the backhaul periods of each transmission frame), each cluster is divided into tiers, according to number of hops from the feeder, as illustrated in FIG. 2a for a cluster 140. The first tier 100 consists of backhaul links between the feeder $A_0$ and nodes $A_1$, $A_2$ and $A_3$ adjacent to (one hop from) the feeder. Backhaul links between the first tier nodes and nodes $A_4$, $A_5$ and $A_6$ are the second tier 120, the second hop from the feeder, i.e., which communicate with the feeder via a relay node (here $A_1$, $A_2$ and $A_3$). Additional tiers (not shown in this embodiment) include links to nodes at additional hops from the feeder. Thus, in backhaul, one link on each branch can transmit concurrently with links on other branches. Here, for example, $A_0$, $A_1$ and $A_6$ form one branch.

As can be seen, FIG. 2a depicts portions of three additional clusters 140', 140", 140''' having edge nodes $B_T$, $C_T$ and $D_T$ which are spatially close to edge nodes $A_4$, $A_5$ and $A_6$, respectively, in cluster 140. It will be appreciated that the same frequency band F is allocated to the nodes in all the clusters for both access and backhaul communication, and the access to backhaul radio resource separation is by allocating different time slots, one for access and other for backhaul.

As known, the available bandwidth F consists of n sub-channels. It is possible to transmit over each sub-channel separately. An exemplary frequency band allocation for communication between the feeder $A_0$ and nodes $A_1$, $A_2$, $A_3$, $A_4$, $A_5$ and $A_6$, respectively, is also indicated in FIG. 2a, for cluster 140. The relays $A_1$, $A_2$, $A_3$ close to the feeder node $A_0$ (the first hop, tier 1) communicate with the feeder $A_0$ over the entire channel F in TDMA manner (i.e., each node A1, A2, A3 communicates at a different time with the feeder). Thus, each of these access points will transmit to (or receive from) the feeder during a different time slot. In other words, when there is transmission between the feeder $A_0$ and $A_1$ in the entire channel F, there is no transmission between $A_0$ and either $A_2$ or $A_3$. In order to reduce interference with adjacent clusters, the relays $A_1$, $A_2$, $A_3$ communicate with their second hop access points (here, the edge nodes) $A_6$, $A_5$ and $A_4$, respectively, over a sub-channel $f_3$, $f_2$, or $f_1$ (a portion of the entire channel F), as described below. While, in a preferred embodiment, the division of bandwidth is into substantially equal sub-channels, this is not required, and the division can be into unequal portions of the total bandwidth. In the illustrated embodiment, the bandwidth is divided into three sub-channels. Alternatively, the bandwidth can be divided into between 2 and up to about 16 sub-channels.

FIGS. 2b-2h illustrate the allocation of time slots and frequencies in backhaul for the nodes $A_0$-$A_6$ of FIG. 2a, according to one embodiment of the invention. The illustrated transmission is divided into 4 time slots: $T_0$ (access time) and $T_1$, $T_2$ and $T_3$ (all backhaul time). The access time will not be discussed herein. It will be appreciated that time slots are provided for both transmission and reception, although only one is illustrated in these figures.

The time and frequency allocation for feeder node $A_0$ is shown in FIG. 2b. During time slot $T_1$, there is backhaul communication between feeder node $A_0$ and first tier node $A_1$ ($A_0$-$A_1$) over the whole bandwidth F. Backhaul communication between nodes $A_0$ and $A_2$ ($A_0$-$A_2$), over the whole bandwidth F, occurs during time slot $T_2$, and between nodes $A_0$ and $A_3$ ($A_0$-$A_3$), over the entire bandwidth F, during time slot $T_3$.

The time and frequency allocation for node $A_1$ is shown in FIG. 2c. Time slot $T_1$ is used for backhaul to or from the feeder node $A_0$ (as also shown in FIG. 2b). Time slots $T_1$ and $T_2$ are used for transmitting between $A_1$ and $A_6$ in sub-channel $f_3$, which, in the illustrated embodiment, constitutes a third of the entire bandwidth F. This is done in order to reduce interference from spatially close edge node $D_T$ in cluster 140" (see FIG. 2a). In the same manner (and for the same reason), edge node $D_T$ transmits to its adjacent node (not shown) over a sub-channel $f_2$, which constitutes a different third of the total bandwidth F, so as not to cause interference, itself, with edge node $A_6$. It will be appreciated that, if desired, the bandwidth can be divided into more than the three sub-channels illustrated in this embodiment.

Similarly, the time and frequency allocations for nodes $A_2$ and $A_3$ are shown in FIGS. 2d and 2e. Backhaul over the whole bandwidth F between the feeder node $A_0$ and node $A_2$ is illustrated in time slot $T_2$ ($BH_1$), and between $A_0$ and $A_3$ is illustrated in time slot $T_3$ ($BH_2$). While feeder node $A_0$ communicates with another first tier node ($A_1$ or $A_3$) during time slots $T_1$ and $T_3$, backhaul transmission can occur between nodes $A_2$ and $A_5$ in sub-channel $f_2$, over a portion of the entire bandwidth F. In this way, edge node $A_5$ and spatially close edge node $C_T$ in adjacent cluster 140', can communicate concurrently on two different portions of the bandwidth substantially without interfering with one another. During time slots $T_1$ and $T_2$, when feeder node $A_0$ communicates with node $A_1$ or $A_2$, backhaul transmission can occur between nodes $A_3$ and $A_4$ in sub-channel $f_1$, over a portion of the bandwidth F. In this way, interference from edge node BT in cluster 140''', which transmits at the same time over a different portion of the bandwidth, here $f_3$, can be substantially eliminated.

The time and frequency allocations for nodes $A_4$ to $A_6$ are shown in FIGS. 2f to 2h. These nodes are second tier nodes and have no direct communication with feeder node $A_0$. Rather, they communicate with the feeder node through their intermediate relay nodes. Thus, as shown in FIG. 2f, backhaul transmission between nodes $A_4$ and $A_3$ occurs during time slots $T_1$ and $T_2$, over bandwidth $f_1$ (corresponding to FIG. 2e). As shown in FIG. 2g, backhaul transmission between nodes $A_5$ and $A_2$ occurs during time slots $T_1$ and $T_3$, over bandwidth $f_2$ (corresponding to FIG. 2d). And, as shown in FIG. 2h, backhaul transmission between nodes $A_6$ and $A_1$ occurs during time slots $T_2$ and $T_3$, over bandwidth $f_3$ (corresponding to FIG. 2c), while edge node $D_T$ transmits over a different portion of the bandwidth, here $f_1$.

It will be appreciated that first tier relay nodes must transfer traffic for their own coverage area and also must forward traffic to the next tier. Therefore, the relay nodes need about twice the capacity as the second tier links. It would be sufficient to allocate ½ the bandwidth to the second tier, so as to prevent backhaul performance degradation. In this embodiment, only ⅓ the bandwidth is allocated to each second tier link, which could appear to reduce the traffic over this link. However, it is possible to compensate for this performance degradation in a number of ways. In this embodiment, compensation is provided by allocating twice the time for communication over second tier links, thereby preventing degradation of backhaul performance. Thus, substantially the same backhaul capacity is provided to each node, regardless of whether it is in an inner tier (closer to the feeder) or an outer tier (an edge node). However, it will be appreciated that the time division illustrated in FIGS. 3b to 3h is only one possible example. Other ways of compensating for the smaller bandwidth in the edge nodes can, alternatively, be employed.

It is a particular feature of the invention that the fractional frequency re-use can substantially eliminate interference between clusters and the need to coordinate between adjacent feeders. This can be accomplished by an operator, either before or after deployment, by configuring the edge nodes (outermost backhaul links) of each cluster to operate on a portion of the frequency band (e.g., frequency re-use 1:3) which does not conflict with an edge node on a spatially close cluster. Alternatively, the edge nodes can be programmed to report to their feeder nodes interference received from nodes in other clusters, and the feeder nodes can include a software algorithm which configures the edge nodes to utilize bandwidth that will substantially eliminate that interference.

While the present application relates only to backhaul communication, it will be appreciated that access communication is preferably coordinated with the backhaul communication. Thus, the network can be configured to permit only access or only backhaul at any given time, or there can be coordination permitting access communication at the same time as backhaul communication over spatially separated links in the cluster.

Figure 3:
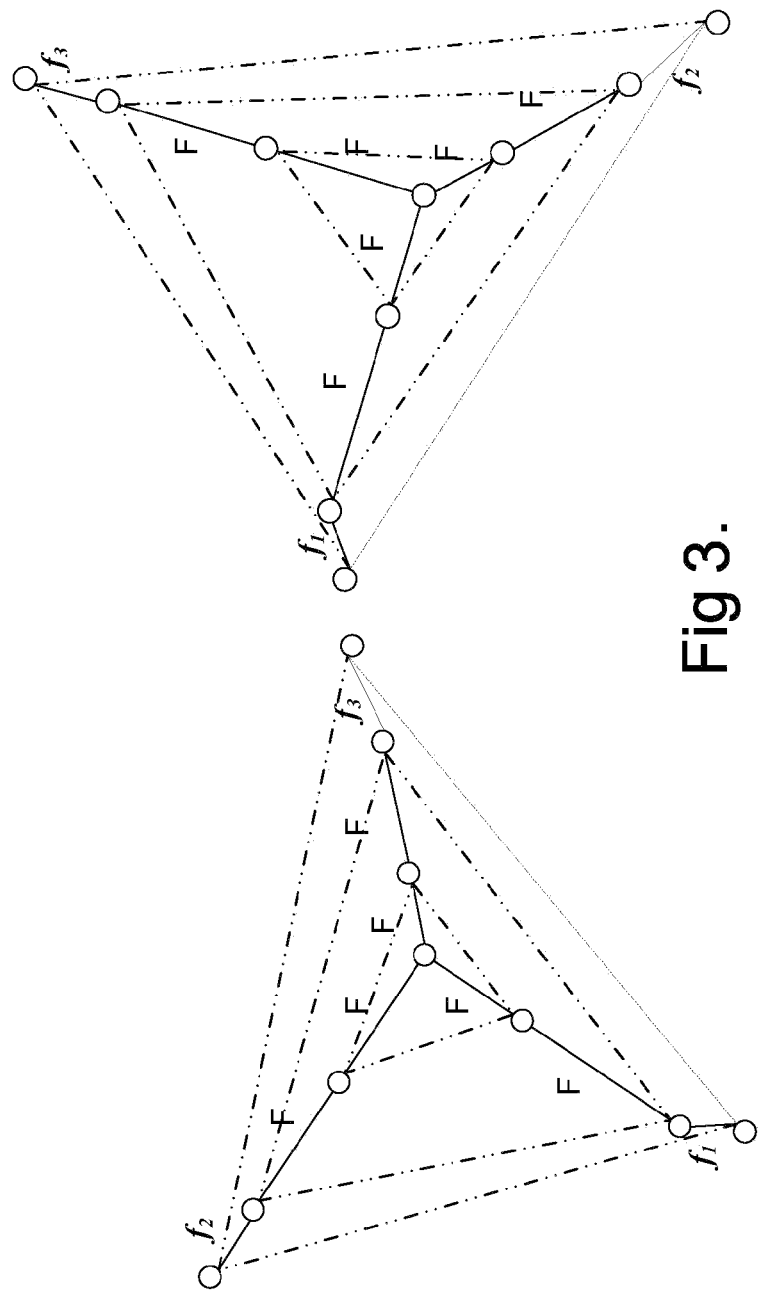
FIG. 3 is a schematic illustration of a spatial interference mitigation scheme for an access point, according to an alternative embodiment of the invention.

It will be appreciated that, in multi-hop embodiments, there can be more than 2 tiers, as shown, by way of example only, in FIG. 3. In this case, all nodes along the route in the inner tiers 150 (closer to the feeder) will utilize frequency re-use 1:1 (transmit over the entire bandwidth at different times) and only the outermost tier 152 (edge nodes), which is closest to adjacent clusters, will utilize frequency re-use 1:n, i.e., transmitting at the same time over a portion of the available bandwidth. Thus, in other embodiments, frequency re-use can be to more than three sub-channels.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A backhaul network for a mobile wireless network including a plurality of clusters of nodes, each cluster including a feeder node coupled to a core network and at least one node coupled in multi-hop topology to the feeder node, the backhaul network comprising:

said nodes in each cluster forming links;

said links utilizing a 1:n frequency re-use scheme in backhaul communication wherein an entire bandwidth of the network is divided by n, where n equals 2 to about 16, wherein each wireless backhaul link at an edge of a cluster communicates over a different portion of said bandwidth at a same time.

2. A method of reducing interference in a mobile wireless network including a plurality of clusters of nodes, each cluster including a feeder node coupled to a core network and at least one node coupled in multi-hop topology to the feeder node, the method comprising:

utilizing a 1:n frequency reuse scheme in backhaul communication wherein an entire bandwidth of the network is divided by n, where n equals 2 to about 16, for at least two spatially adjacent nodes in the network having uncoordinated radio resources;

wherein each of said nodes transmits over a different portion of said entire bandwidth at a same time.

3. The method according to claim 2, wherein, during transmission between a feeder and a first tier node on one branch in the network over a bandwidth, a second tier node on a second branch communicates concurrently with a first tier node on said second branch over said bandwidth.

4. The method of reducing interference according to claim 2, the method comprising:

dividing each cluster into tiers, according to number of hops to the feeder, said outermost tier defining an edge of a cluster;

a first tier including all nodes coupled directly to the feeder;

additional tiers including all nodes coupled to said feeder via a relay node;

utilizing a 1:1 frequency reuse scheme within innermost tiers in each cluster in wireless backhaul communication, wherein all nodes over an entire available bandwidth at different times; and utilizing said 1:n frequency re-use scheme in an outermost tier in wireless backhaul communication, wherein spatially close nodes in said outermost tier transmit at a same time over a different portion of said entire available bandwidth.

5. The method according to claim 4, wherein, during backhaul transmission between a feeder and a first tier node over said entire bandwidth, a second tier node coupled to a different first tier node communicates concurrently with said different first tier node over a portion of said bandwidth.

6. A mobile wireless network comprising:

a plurality of nodes, said nodes being coupled for wireless communication in virtual clusters of nodes, each cluster including a feeder coupled to a core network, a wireless link being formed between each pair of adjacent nodes, each node including at least one, and preferably a plurality of radio transceivers providing access communication and point-to-point in-band backhaul communication over the link;

a modem coupled to each transceiver;

a plurality of antennas mounted in the node, one coupled to each modem, the antennas being able to provide multiple concurrent transmissions over multiple antennas; a controller in each node adapted and configured for control and coordination of the transceivers and associated modems;

means for creating sectorization of each node; and an interference mitigation system between adjacent clusters during wireless backhaul communication comprising:

means for dividing each cluster into virtual tiers, according to number of hops to the feeder, means for causing transmission utilizing a 1:1 frequency re-use scheme during wireless backhaul communication within innermost tiers in each cluster, wherein all transmit over an entire available bandwidth at different times; and means for causing transmission during wireless backhaul communication utilizing a 1:n frequency re-use scheme in an outermost tier, where n is between 2 and about 16, wherein spatially close nodes in said outermost tier in adjacent clusters transmit at a same time over a different portion of said entire available bandwidth.

7. The backhaul network according to claim 6, wherein said wireless network is a WiMAX network according to Standard 802.16e2005, and further comprising conventional wired backhaul from said feeder to a core network.

* * * * *